(No Model.)
T. A. EDISON.
METHOD OF MAINTAINING TEMPERATURE IN WEBERMETERS.
No. 265,774. Patented Oct. 10, 1882.
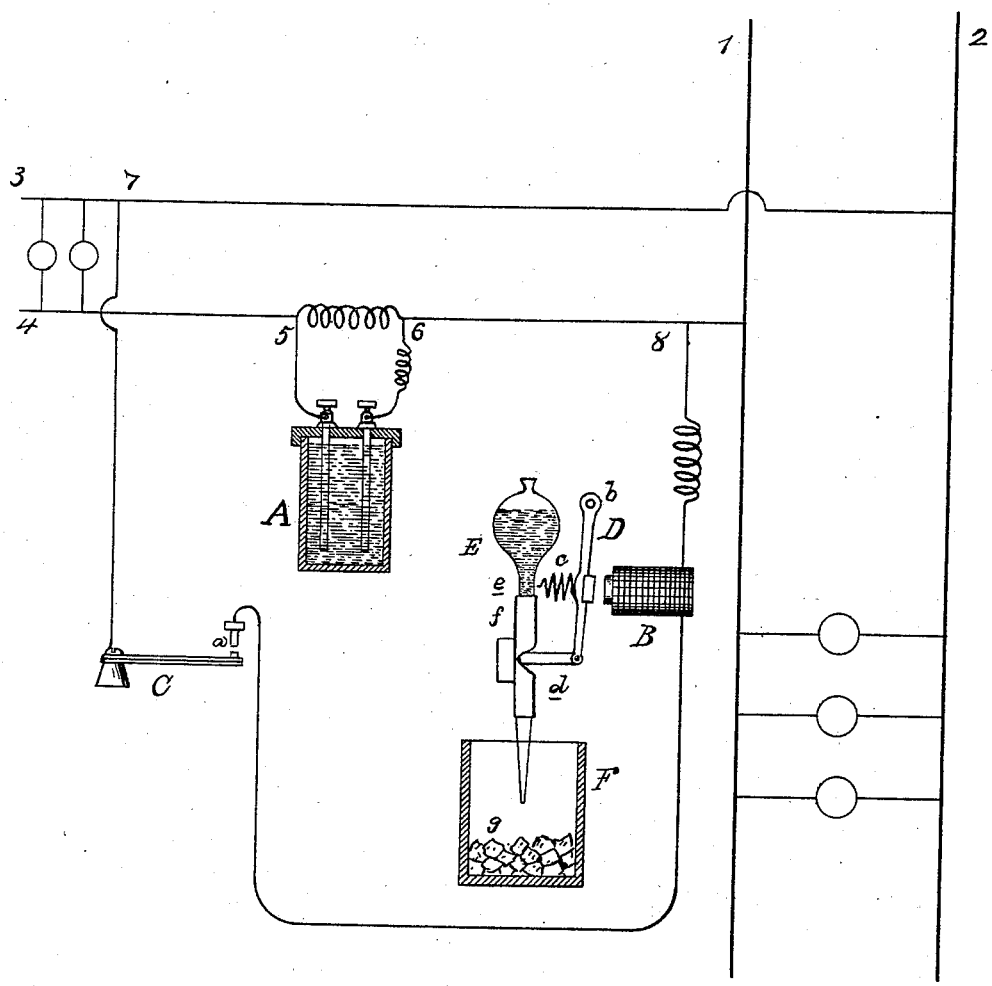
WITNESSES:
E. C. Rowland
J. Clark.
INVENTOR:
Thomas A. Edison,
By Rich'd N. Dyer
Atty.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

METHOD OF MAINTAINING TEMPERATURE IN WEBERMETERS.

SPECIFICATION forming part of Letters Patent No. 265,774, dated October 10, 1882.

Application filed November 11, 1881. (No model.)

*To all whom it may concern:*

Be it known that I, THOMAS A. EDISON, of Menlo Park, in the county of Middlesex and State of New Jersey, have invented a new and useful Improvement in Webermeters, (Case No. 350;) and I do hereby declare that the following is a full and exact description of the same, reference being had to the accompanying drawing, and to the letters of reference marked thereon.

An electrolytic webermeter used in connection with a group or house system of lamps or translating devices to measure the amount of energy supplied thereto from a central station must sometimes be placed in a position where it will be exposed to fluctuations of temperature and incur danger of the freezing of the liquid. During the continuance of such freezing, if it should happen, the webermeter would of course fail to perform its duty.

The object of this invention therefore is to provide a method which will insure a maintenance of temperature above the freezing-point within the webermeter box or case.

The method may be stated generally as consisting in causing a dangerous fall of temperature to set in action agencies which then act upon means arranged and adapted to heat to the necessary degree the atmosphere within the webermeter box or case, or around and in immediate contiguity to the webermeter. Suitable means for carrying this into practice may be briefly described as follows: Within the webermeter box or case a thermostatic spring is arranged, with its free end controlling directly or through intermediate mechanism the vent of a small water-reservoir, and in such manner that at ordinary or non-dangerous temperatures the vent is entirely closed, but so that when the temperature falls to near the freezing-point the vent shall be opened and permit the water to escape in a small stream or drop by drop. Below the vent, and so that the water issuing therefrom shall fall therein, is a receptacle holding a quantity of acetate of soda or of quicklime. The vent being opened and water falling thereon, heat is generated, which raises the temperature within the box and prevents the freezing of the liquid.

It is evident that the thermostat, instead of acting directly or through intermediate mechanical means, may operate to close a circuit, which may be derived from the main circuit through a magnet controlling the vent, or that it may act as the stop to a clock-work, which, released, shall pump water upon the material used, or which may control the vent.

A convenient mode of carrying my invention into effect is illustrated diagrammatically in the annexed drawing.

3 4 is the house-circuit whose current is to be measured, which is derived from the main line 1 2. In a shunt, 5 6, from the circuit 3 4 is the electrolytic-cell meter A.

7 8 is a multiple-arc circuit from the circuit 3 4, including the coils of an electro-magnet, B, and also including the compound thermostatic bar C, whose free end is normally held away from contact at *a*, thus keeping open the circuit 7 8; but on a considerable decrease of temperature, sufficient to cause danger of the freezing of the liquid in the cell A, the unequal contraction of the two metals which compose the bar C causes a movement of such bar and closes the circuit. The magnet B, being thus energized, draws toward its poles the armature-lever D, which is pivoted at *b*, and has a retracting-spring, *c*. To the lever D is attached an arm, *d*.

E is a vessel containing water, its lower end formed into a tube, *e*, which enters a rubber tube, *f*. The lower end of tube *f* is placed over a vessel, F, containing pieces of quicklime *g*. When the circuit 7 8 is open and the magnet B not energized the arm *d* presses against the rubber tube *f*, so as to close it and prevent the water from escaping; but when the magnet is energized the arm *d* is withdrawn and the water is allowed to drop into the vessel F onto the lime, and the heat thus evolved warms the liquid in the meter, which is in close proximity thereto, and prevents the freezing thereof.

It is also evident that the thermostatic spring may act to close an electrical circuit through a resistance adapted to be heated thereby, and placed in proximity to the webermeter cell or cells, or to close a circuit to an electric lamp placed in the same position for heating the temperature.

Separate application for patent has been made for some of these specific means of carrying the method into effect, and for the others such separate applications will be hereafter made; hence they are not claimed herein; but What I do claim herein is—

The herein-described method of maintaining the temperature of the liquid in an electrolytic cell above the freezing-point, which consists in causing a fall in temperature to set in action agencies for generating heat, substantially as set forth.

This specification signed and witnessed this 21st day of September, 1881.

THOMAS A. EDISON.

Witnesses:
H. W. SEELY,
RICHD. N. DYER.